United States Patent

[11] 3,583,251

| [72] | Inventor | Anders Adolf Peterson<br>Elmira, N.Y. |
|---|---|---|
| [21] | Appl. No. | 826,328 |
| [22] | Filed | May 21, 1969 |
| [45] | Patented | June 8, 1971 |
| [73] | Assignee | Hardinge Brothers, Inc.<br>Elmira, N.Y. |

[54] VARIABLE SPEED DRIVE
14 Claims, 17 Drawing Figs.

| [52] | U.S. Cl. | 74/230.17 |
|---|---|---|
| [51] | Int. Cl. | F16h 55/52 |
| [50] | Field of Search | 74/230.17, 217 |

[56] References Cited
UNITED STATES PATENTS

| 2,407,899 | 9/1946 | Nye | 74/230.17X |
|---|---|---|---|
| 2,718,119 | 9/1955 | Prince | 74/230.17UX |
| 3,068,677 | 12/1962 | Buss | 74/230.17X |
| 3,129,598 | 4/1964 | Buss | 74/230.17 |
| 3,301,077 | 1/1967 | Caughlin | 74/230.17 |
| 3,314,312 | 4/1967 | Niehaus | 74/230.17X |

*Primary Examiner*—Leonard H. Gerin
*Attorney*—Shlesinger, Arkwright and Garvey

ABSTRACT: This disclosure shows a V-belt drive mechanism by means of which a variety of different speeds can be obtained automatically for a lathe spindle or other driven part of a machine from a driving motor by means of a programmer acting through a hydraulic mechanism.

PATENTED JUN 8 1971

INVENTOR.
Anders Adolf Peterson
BY
Schlesinger, Arkwright & Garvey
ATTORNEYS.

INVENTOR.
Anders Adolf Peterson
BY
Shlesinger, Arkwright & Garvey
ATTORNEYS.

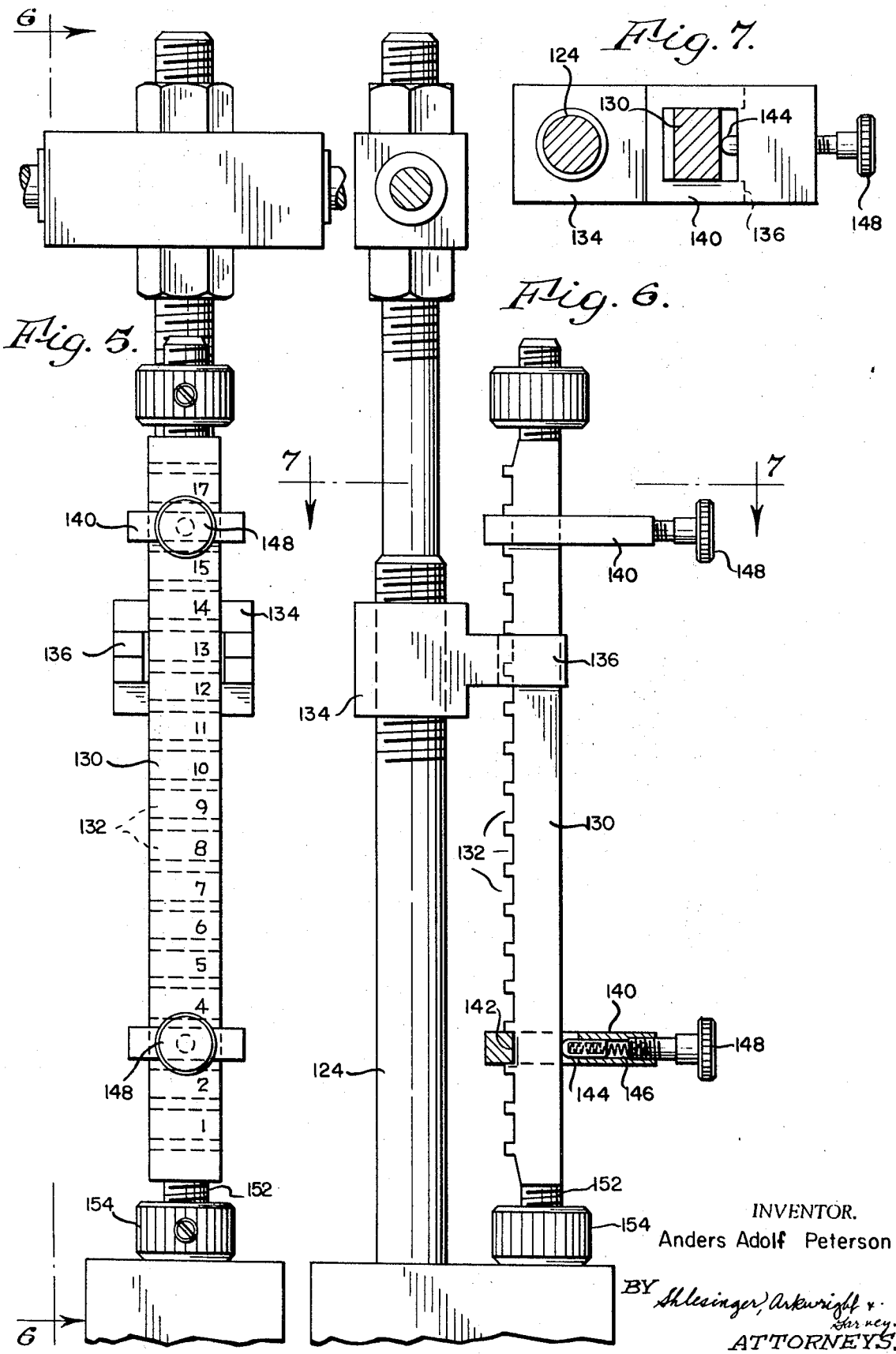

INVENTOR
Anders Adolf Peterson

VARIABLE SPEED DRIVE

One of the objects of this invention is to provide mechanism of improved construction which may be operated by a programmer or other suitable means through hydraulic mechanism.

Another object is to provide a mechanism of this kind with means for manually setting the mechanism for the desired speeds which limit the extent to which the automatic means may operate.

It is also an object of this invention to provide a hydraulic mechanism including a cylinder and piston arranged to move a carrier for an intermediate pulley assembly, the movement of said hydraulic mechanism being controlled by a manually adjustable stop member.

Figure 2:
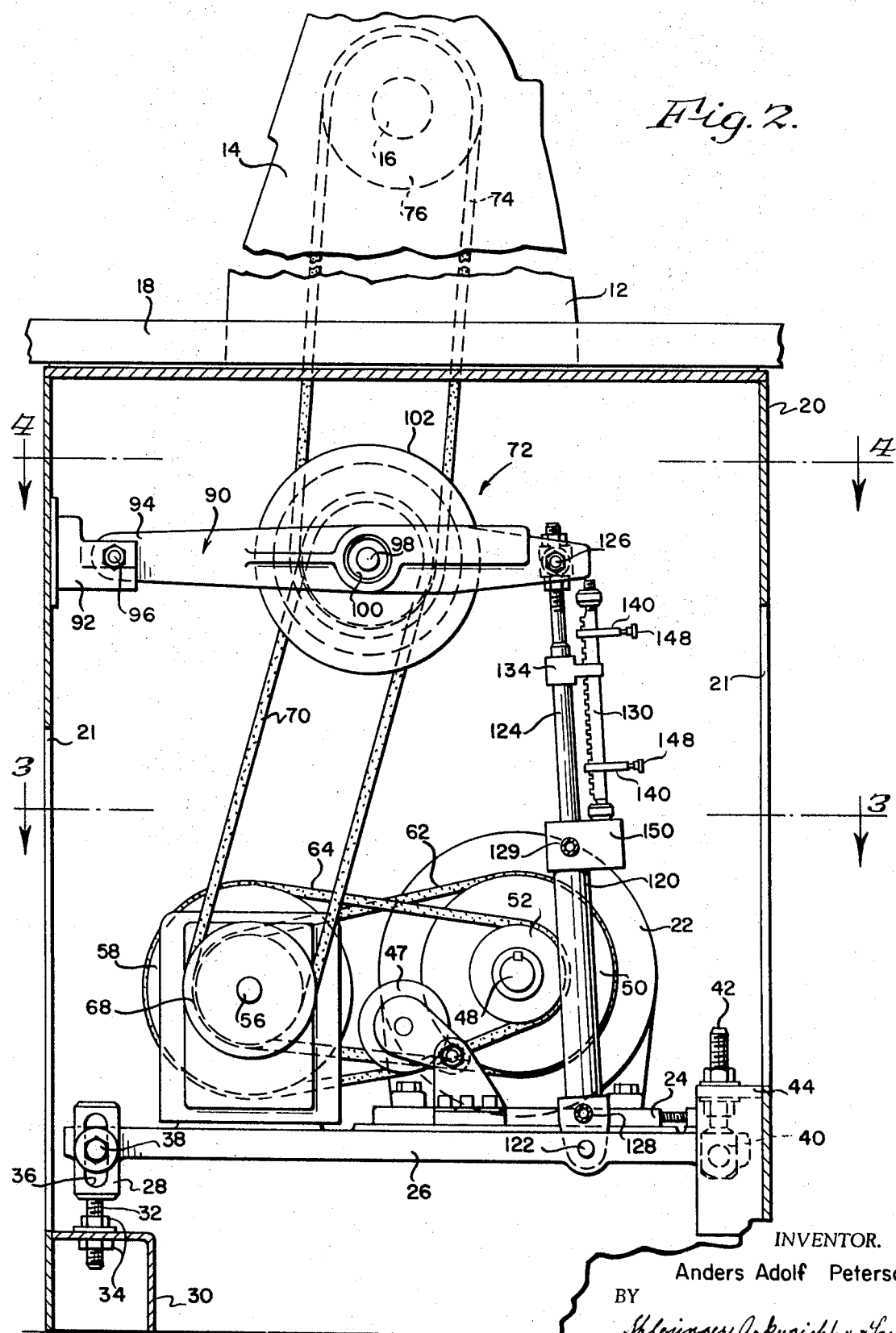
FIG. 2 is a transverse sectional elevation thereof showing a side elevation of the variable speed drive mechanism.
Figure 3:
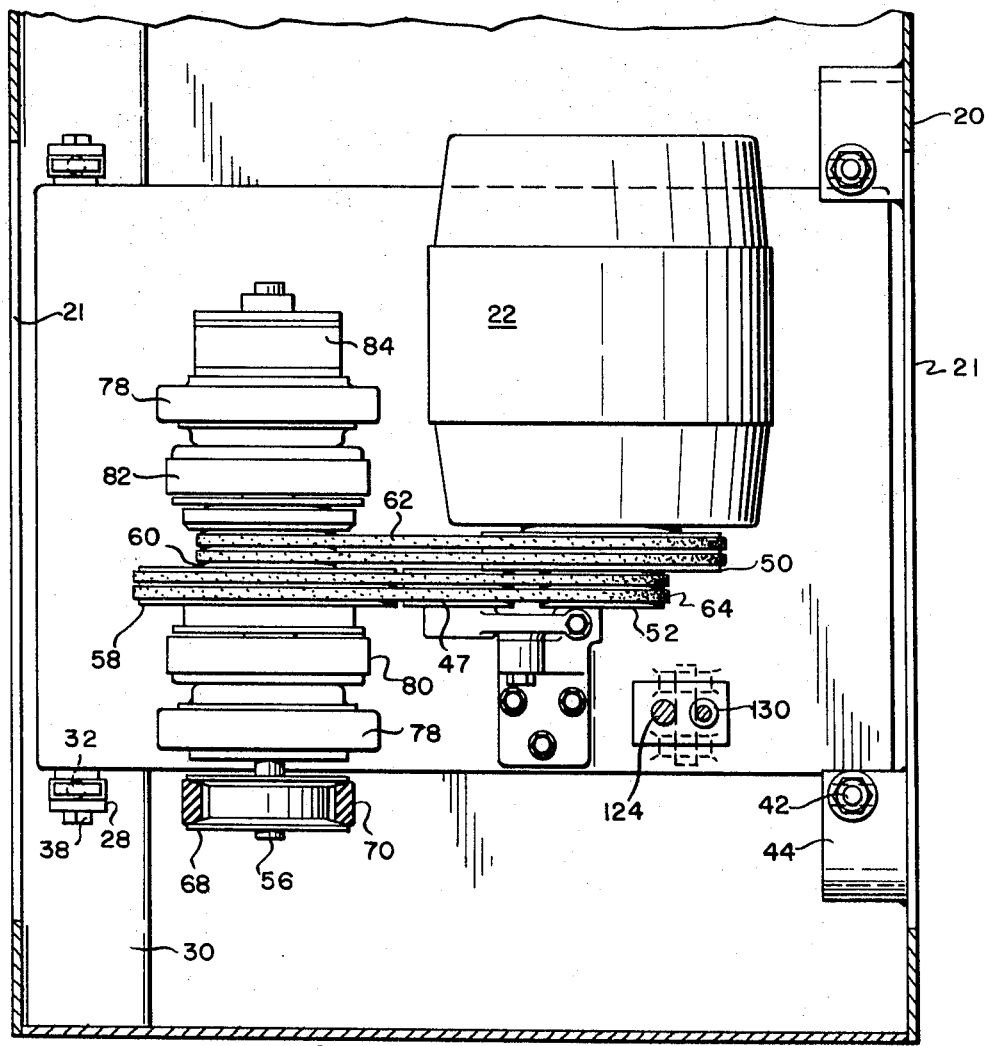
Figure 4:
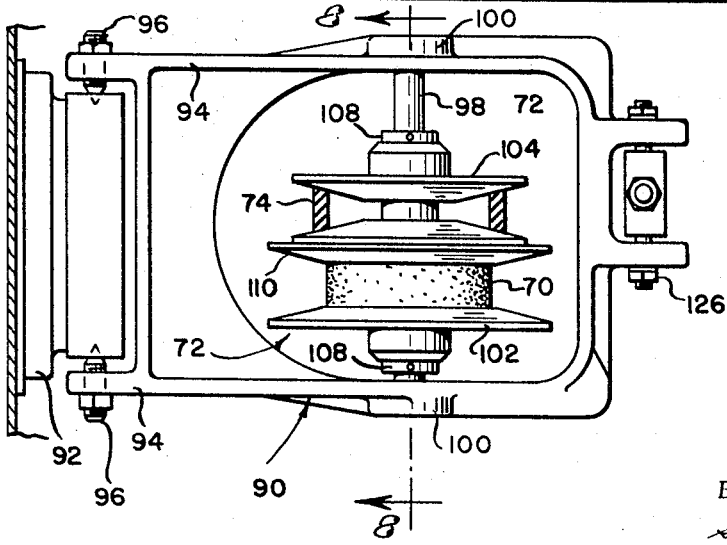

FIGS. 3 and 4 are sectional plan views thereof on line 3-3 and 4-4 respectively of FIG. 2.

FIG. 5 is a fragmentary elevation thereof on an enlarged scale showing a mechanism for selecting various speeds at which the drive is to be operated.

FIG. 6 is a side elevation thereof on line 6-6 of FIG. 5.

FIG. 7 is a fragmentary transverse sectional view thereof on line 7-7 of FIG. 6.

Figure 8:
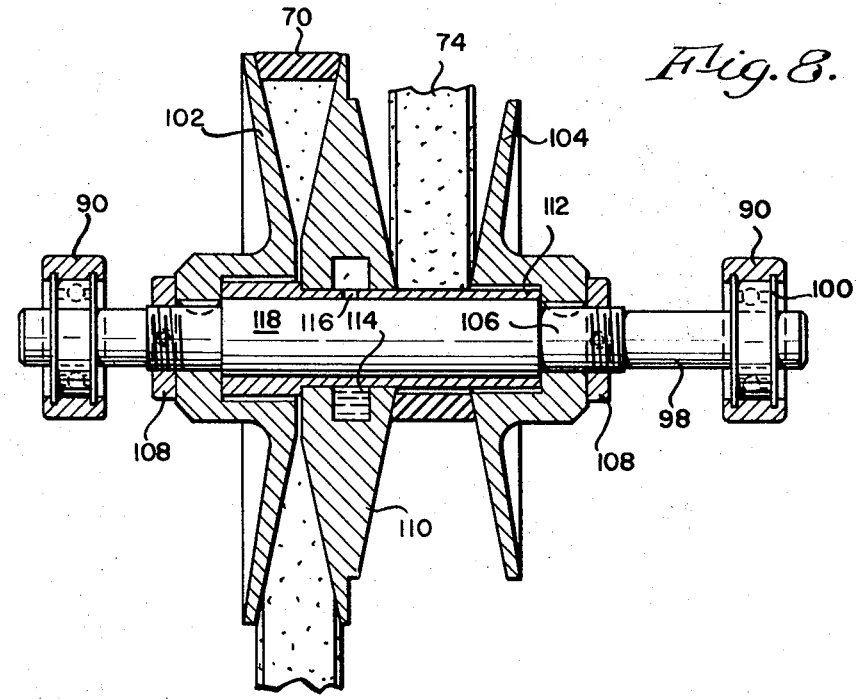

FIG. 8 is a fragmentary sectional plan view thereof on line 8-8 of FIG. 4.

Figure 9:
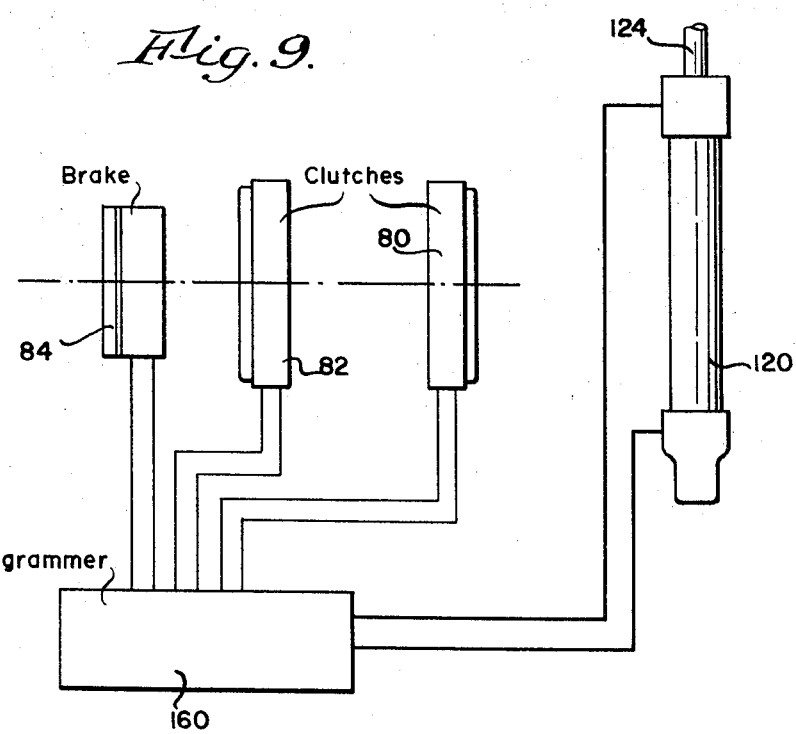

FIG. 9 is a schematic view of the mechanism for effecting the speed changes.

Figure 10:
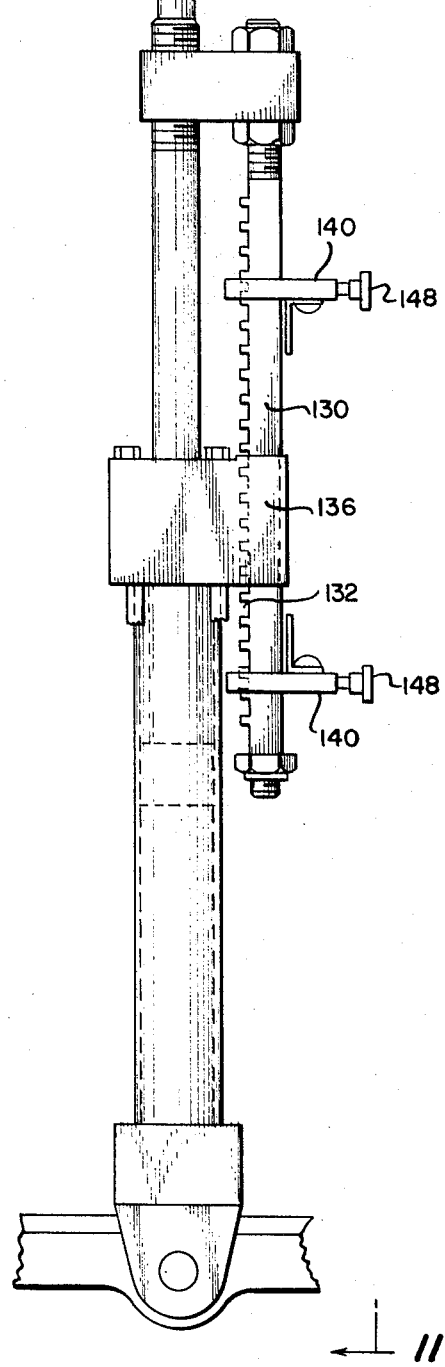

FIG. 10 is an alternate construction of the mechanism shown in FIG. 6.

Figure 11:
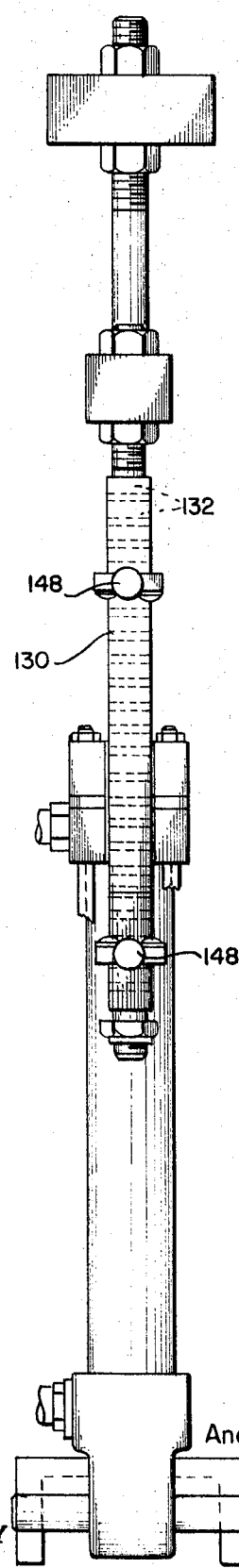

FIG. 11 is a side elevation of the embodiment of FIG. 10 viewed in the direction of arrows 11-11.

The variable speed drive embodying this invention is illustrated for use in connection with driving a spindle of a lathe but it will be understood that it is not intended to limit this invention for use with such machine.

Figure 1:
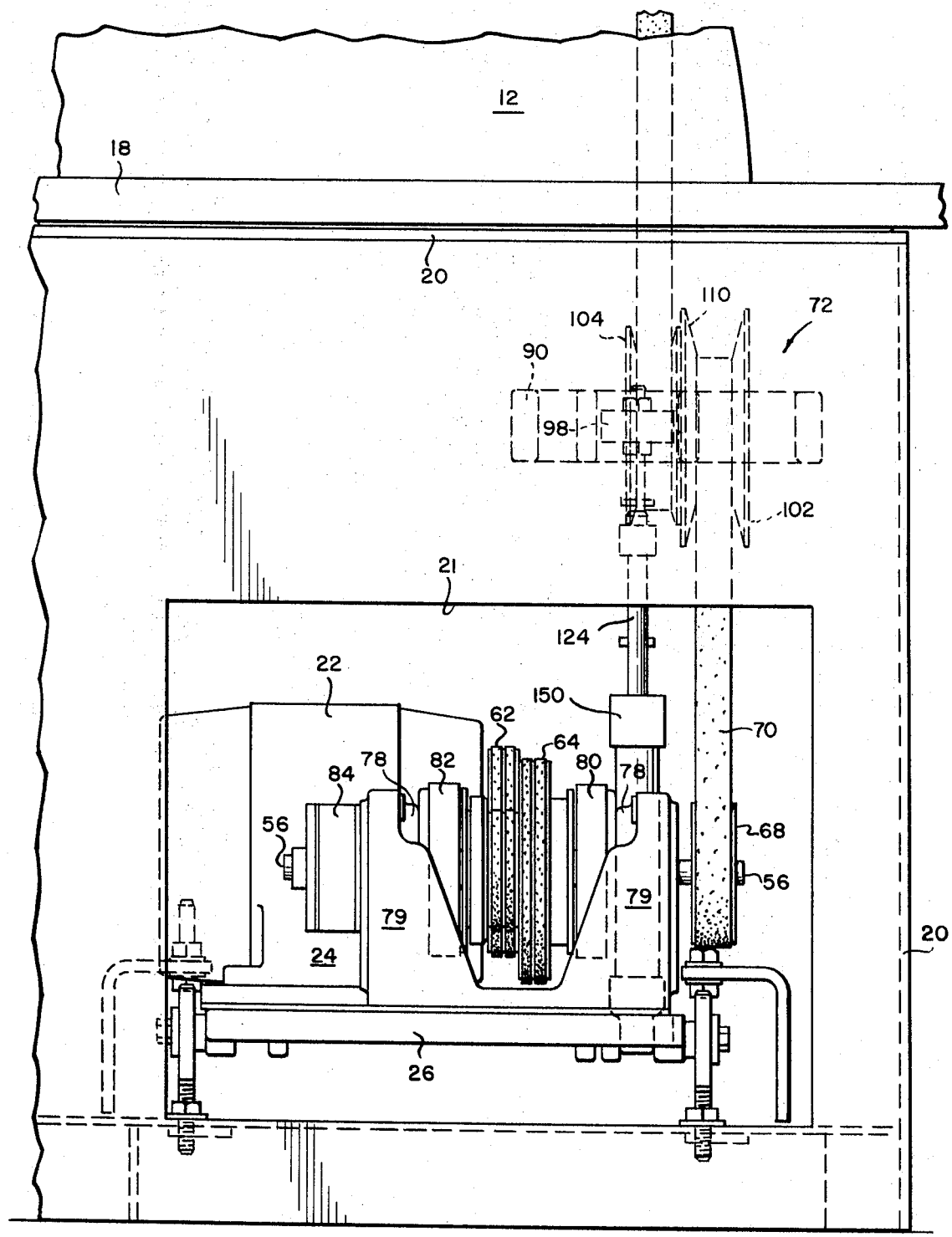
FIG. 1 is a fragmentary longitudinal section of a lathe showing a front elevation of the variable speed drive mechanism embodying this invention.

In FIGS. 1 and 2, 12 represents a lathe bed or base having a headstock 14, FIG. 2, on which a spindle 16, FIG. 2, is arranged to be driven at various speeds. The lathe is mounted on a pan 18 secured to the top of a frame or cabinet 20 in which the variable speed mechanism is arranged, the cabinet being provided with openings 21 through which parts of the mechanism are accessible.

22 represents a motor which may be of any usual construction, that shown being a single speed electric motor which is provided with a base 24 adjustably mounted on a platform 26 by means of which the driving mechanism mounted on the platform 26 may be adjusted. This platform may be mounted at one end by suitable clamps on an upwardly extending bracket 28 secured to a stiffener 30 which may be a part of the cabinet 20. The bracket 28 may be adjustable vertically relatively to the stiffener 30 in any suitable manner, for example, by means of an integral threaded shank 32 adjustably held in place on the stiffener 30 by means of clamping nuts 34. The bracket 28 is provided with an upright slot 36 through which a bolt 38 extends which forms a support for the adjacent end of the main platform 26. The other end of this platform may be pivotally mounted on supporting members 40 having an integral threaded shank 42 and suspended from a bracket 44 secured to the cabinet 20. Any other means for actuating the main platform 26 may be used as desired to provide the correct relationship and tension of the various belts forming a part of this variable speed drive. If it is found impracticable to obtain the correct tension of the two driving belts driven by the motor 22 a belt tensioning roller or roller pulley 47 may be employed to apply additional tension to one of these belts while the other belt is tensioned by the platform adjustment described. The pulley 47 may have a base mounted on the platform 26 and the roller pulley may have its bearing adjustably mounted on the base.

The motor 22 has a shaft 48 on which two pulleys 50 and 52 of different diameters are secured, the pulley 50 being of larger diameter than the pulley 52.

The motor drives a countershaft 56 on which are mounted two pulleys 58 and 60. The larger pulley 58 is driven by means of belts 64 from the smaller pulley 52 of the motor shaft. The smaller pulley 60 of the countershaft is driven by means of belts 62 from the larger pulley 50 on the motor shaft.

The countershaft has mounted thereon a pulley 68 cooperating with a belt 70 leading to an intermediate pulley assembly 72 which in turn transmits power at various speeds through the belt 74 to a driven pulley 76 on the lathe spindle.

The countershaft 56 is mounted to rotate freely in bearings 78 formed on a bracket or standard 79 which is suitably secured to the platform 26. This countershaft may be driven by either of the pulleys 58 or 60 by means of clutches. As seen in FIG. 3, a clutch 80 is mounted on the countershaft to connect the pulley 58 with the shaft 56, and the clutch 82, when actuated, connects the pulley 60 with the countershaft 56. There is also provided on the countershaft a brake 84 which may hold the countershaft against rotation. The clutches and brake may be of any usual construction and are consequently not herein illustrated in detail. It will be obvious however that when either clutch is actuated rotation of the countershaft 58 will be transmitted to the pulley 68 for transmission to the intermediate pulley assembly.

The intermediate pulley assembly 72 may be of a type commonly used with change speed mechanisms, and in the construction shown an outer frame member or carrier 90 is pivoted at one end on a support 92 secured on the frame or stand 20. In the construction shown, the carrier has two arms 94 extending outwardly from one end thereof and adjustable pins 96 are mounted on these arms and enter into recesses or conical holes in the support 92 so that the carrier 90 may swing freely in a vertical direction relatively to the stand.

As best shown in FIGS. 4 and 8, the intermediate pulley assembly includes a shaft 98 which is journaled to rotate freely in bearings 100 in the carrier 90 and this shaft has mounted thereon two fixed, belt-engaging pulley members 102 and 104 which are keyed or otherwise secured to the shaft 98. A sleeve or portion 106 of enlarged diameter of the shaft is interposed between the shaft 98 and the hubs of the two pulley members 102 and 104. These pulley members are securely positioned against endwise movement on the shaft by means of nuts 108 having a threaded engagement with the sleeve 106. Between these two pulley members 102 and 104 which are keyed or otherwise secured in fixed relation to the shaft 98, is arranged an intermediate movable pulley member 110 which has fixedly mounted in it a sleeve or hollow shaft 112 to rotate about the shaft 98. The intermediate pulley member 110 with the bushing 112 is consequently movable lengthwise of the shaft 98 and relatively to the pulley members 102 and 104. The belt 74 is driving the lathe spindle and is positioned between the pulley member 104 and the movable pulley member 110, and the belt 70 from the countershaft 56 operates between the intermediate pulley member 110 and the other pulley member 102. The movable pulley member 110 may be provided in its hub with an annular groove 114 facing the sleeve 112 and this groove may be filled with lubricant. An aperture 116 in the sleeve 112 permits the lubricant to pass into the space between the sleeve 112 and the enlarged portion 118 of the shaft 98 to insure free movement between them.

By means of this construction the movable pulley member 110 may be readily moved axially into different positions toward or from the two stationary pulley members 102 and 104. Consequently it will be obvious that if the tension of the belt 70 which operates between the two pulley members 102 and 110 is increased or decreased, then due to difference in pressure of the belt 70 on the movable pulley member 110, will result in moving the member to the right or left, thus moving the belt 74 to contact with the pulley members 104 and 110 at a greater or less distance from the axis of the shaft 98, thus causing the belt 74 to cooperate with portions of the pulley members 104 and 110 of different diameters, thus changing the speed of travel of the belt 74. By changing the tension of the belt 70 by swinging the carrier 90 about its pivotal mounting, the speed of travel of the belt 74 which connects with the lathe spindle will be varied.

It is one object of this invention to provide means for automatically changing the position of the carrier 90 and for this purpose there is provided a piston and cylinder connection with the carrier which may, for example, be controlled by means of a programmer. In the construction illustrated there is provided a cylinder 120 which is pivotally mounted on the platform 26 at 122, and this cylinder cooperates with a piston rod 124 which is pivotally connected with the outer or free end of the carrier 90 as indicated at 126. Motive fluid under pressure may be introduced into either end of the cylinder 120 in any suitable manner, for example, through pipe 128 in the bottom of the cylinder through a pipe 129 in the cylinder head 150. It will consequently be obvious that when motive fluid under pressure is introduced into either end of the cylinder 121, the piston 124 will be raised, or lowered thus raising or lowering the free end of the carrier 90 about its pivotal connection with the stationary part 92. The extent to which the carrier 90 is raised or lowered determines the speed at which the belt 74 will be driven from the intermediate pulley assembly.

Means are provided to determine the extent to which the piston rod 124 is moved to change the position of the carrier 90 and thus vary the speed of the lathe spindle 16. In the construction shown for this purpose there is provided in parallel relation to the piston rod 124 a control or stop rod 130 provided with means for controlling the extent of travel of the piston rod. In the construction shown in FIG. 6, the control rod has at one face thereof a series of notches 132 and the piston rod 124 is provided with a bracket 134 having an arm 136 extending outwardly therefrom and having a sliding connection with the rod 130 and is thus movable lengthwise of the rod 130. There is also provided means on the rod to be engaged by the arm 134 to limit the movement thereof. For example, there is provided a pair of dogs or stop members 140 which are adjustably mounted on the rod 130 lengthwise thereof. These stop members have releasable connections with the rod, such as projections 142 which are formed to fit into any of the notches 132. These projections 142 are integral parts of stop blocks 140 which have rectangular holes therein slightly larger than the rod 130 and are movable transversely of the rod 130 so that the projections 142 may be moved into and out of any of the recesses 132 in the stop rod. In order to hold these members in place on the stop rod 130 the stop members are preferably provided with plungers 144 mounted to engage the reverse side of the stop rod 130. Each plunger is actuated by means of a spring 146 to urge the stop members yieldingly into position in which the projection 142 thereof may be moved into and out of the notches or recesses 132. A knob 148 may be provided to facilitate the handling of the stop members so that when the knob 148 is pushed toward the stop rod 130 the projection will be moved out of a recess 132 and can be moved up or down along the stop rod 130 into any desired position.

The stop rod may be suitably mounted in any manner on the cylinder head 150 by means of a threaded end 152 of the stop member which may cooperate with a threaded hole in the cylinder head. A lock nut 154 is provided to secure the stop rod correctly in position at the head of the cylinder and if desired the stop rod may be adjusted vertically by means of its threaded engagement with the cylinder head. Two of these stop dogs are provided on the stop rod to provide for two different speeds of the spindle.

In the operation of the device described it will be obvious of course that as diagrammatically shown in FIG. 9, the programmer 160 can control the brake 84 and the clutches 80 and 82 as may be desired, to control two speeds transmitted to the countershaft 56. The programmer also controls the admission of oil or other operating fluid to the cylinder 120.

By means of the construction described the countershaft 56 may be driven at two speeds and an additional two speeds are obtained by means of the hydraulic cylinder 120 against the adjustable stops on the stop rod 130. By properly metering the oil discharged from the cylinder speeds can be changed quite rapidly with a smooth action and no oscillation.

It will be understood that various changes in the details, materials and arrangements of parts which have been herein described and illustrated in order to explain the nature of the invention may be made by those skilled in the art within the principle and scope of the invention as expressed in the appended claims.

What I claim is:
1. A variable speed transmission including:
 a. frame means,
 b. driving and driven pulleys,
 c. an intermediate pulley assembly including a pair of fixed pulley cones having belt-engaging faces spaced apart in opposed relation to each other,
 d. an axially movable belt-engaging pulley member arranged between the belt-engaging faces of said opposed pulley cones and movable toward and from said fixed pulley cones,
 e. belts cooperating with said driving and driven pulleys and with said fixed pulley cones,
 f. each of said belts also engaging a side of said movable pulley member,
 g. a carrier member having an intermediate portion and ends, said intermediate pulley assembly connected to said intermediate portion of said carrier member,
 h. said carrier member being movable toward and from said driving and driven pulleys and having one end pivotally attached to said frame means,
 i. power actuated means for moving said carrier member and having first and second ends,
 j. said power actuated means having said first end attached to the other end of said carrier member and said second end pivotally attached to said frame means,
 k. said carrier member and said power actuated means being positioned at substantially right angles to each other, and
 l. control means for limiting the extent of movement imparted to said carrier member by said power means.
2. A transmission according to claim 1 and wherein:
 a. said power actuated means are a piston and cylinder, one of which is mounted on a stationary support and the other of which is connected with said carrier.
3. A transmission according to claim 2 and wherein:
 a. said cylinder is mounted on a stationary support and,
 b. said piston is connected to said carrier by means of a piston rod,
 c. a stop rod mounted in fixed relation to said piston rod, and
 d. cooperating parts on said cylinder and said stop rod for limiting the travel of said piston.
4. A variable speed transmission as in claim 2 and including:
 a. means for varying the speed of said driving pulley.
5. A variable speed transmission as in claim 4 and wherein:
 a. said means for varying the speed of said driving pulley is controlled by means of a programmed controlling means 160.
6. A variable speed transmission as in claim 5 and wherein:
 a. said programmed controlling means also controls the actuation of said piston within said cylinder.
7. A transmission according to claim 2 and wherein:
 a. said cylinder is mounted on a stationary support and said piston is connected to said carrier by means of a piston rod,
 b. a stop rod mounted in fixed relation to said cylinder,
 c. and cooperating parts on said piston rod and said stop rod for limiting the travel of said piston.
8. A transmission according to claim 7 and wherein:
 a. said stop rod has an outwardly extending part engageable by said piston rod to stop movement of said piston and, b. said part of said stop rod being adjustable lengthwise of said stop rod to determine the length of travel of said piston.

9. A transmission according to claim 8 and wherein:
a. said cooperating parts are adjustable to vary the extent of travel of said piston.

10. A transmission according to claim 8 and wherein:
a. said piston rod has a laterally extending part and,
b. said stop rod has upper and lower outwardly extending parts extending into the path of movement of said laterally extending part of said piston to limit the movement of said piston in two directions.

11. A transmission according to claim 10 and wherein:
a. said upper and lower outwardly extending parts are longitudinally adjustable on said stop rod.

12. A transmission as in claim 10 wherein:
a. said stop rod includes a plurality of indexing notches thereon,
b. said upper and lower outwardly extending parts including portions engageable in said notches, and
c. spring biasing said engageable portions into said notches.

13. A transmission as in claim 12 and wherein:
a. said upper and lower outwardly extending parts are longitudinally adjustable on said stop rod.

14. A transmission according to claim 7 and wherein:
a. said piston rod has a sliding connection with said stop rod, and
b. cooperating parts on said piston rod and stop rod for limiting the extent of movement of said piston.